United States Patent [19]

Frazier

[11] Patent Number: 4,462,309
[45] Date of Patent: Jul. 31, 1984

[54] NUTCRACKING MACHINE

[76] Inventor: James G. Frazier, 10830 Yosemite Blvd., Waterford, Calif. 95386

[21] Appl. No.: 460,645

[22] Filed: Jan. 24, 1983

[51] Int. Cl.³ .............................................. A23N 5/00
[52] U.S. Cl. ...................................... 99/575; 99/577; 99/618; 99/621
[58] Field of Search .......... 99/568, 569, 572, 574–576, 99/577–579, 581–583, 617–622; 241/187, 230, 235; 225/97, 103

[56] References Cited

U.S. PATENT DOCUMENTS

| 853,066 | 5/1907 | Crellin | 99/575 X |
| 2,307,656 | 1/1943 | Abbott | 99/569 |
| 2,879,952 | 3/1959 | Pollitz et al. | 241/235 |
| 2,954,810 | 10/1960 | Bond | 99/574 |

Primary Examiner—Timothy F. Simone
Attorney, Agent, or Firm—Bruce H. Johnsonbaugh

[57] ABSTRACT

A nutcracking machine is provided which utilizes a cylindrical sizing roll and a cylindrical cracking roll. The sizing roll has a plurality of parallel circumferential grooves, the width and depth of the grooves varying in a predetermined fashion along the length of the roll. The cracking roll has a tractive surface. A spring mounting is used for adjustably and resiliently urging the sizing roll and cracking roll together to allow a predetermined lateral pressure to be exerted on the nuts passing between the rollers. The spring mounting also allows the rollers to separate momentarily to allow passage of foreign objects such as rocks. A separator is used to direct smaller nuts to one portion of the sizing roll and larger nuts to another portion of the sizing roll.

5 Claims, 7 Drawing Figures

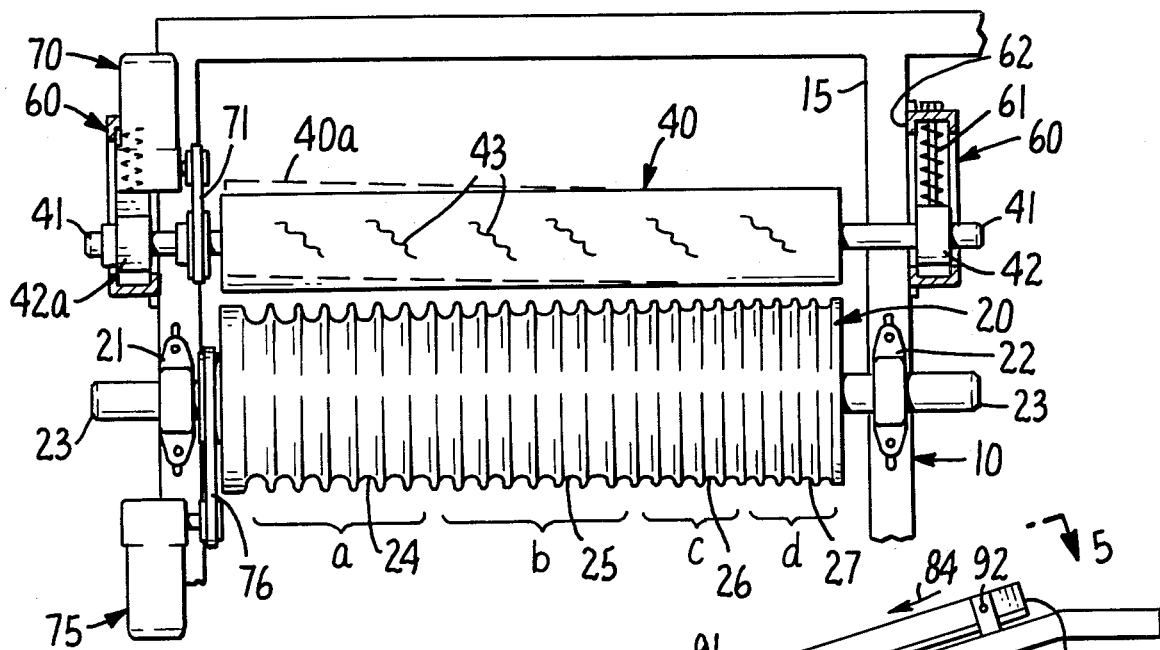
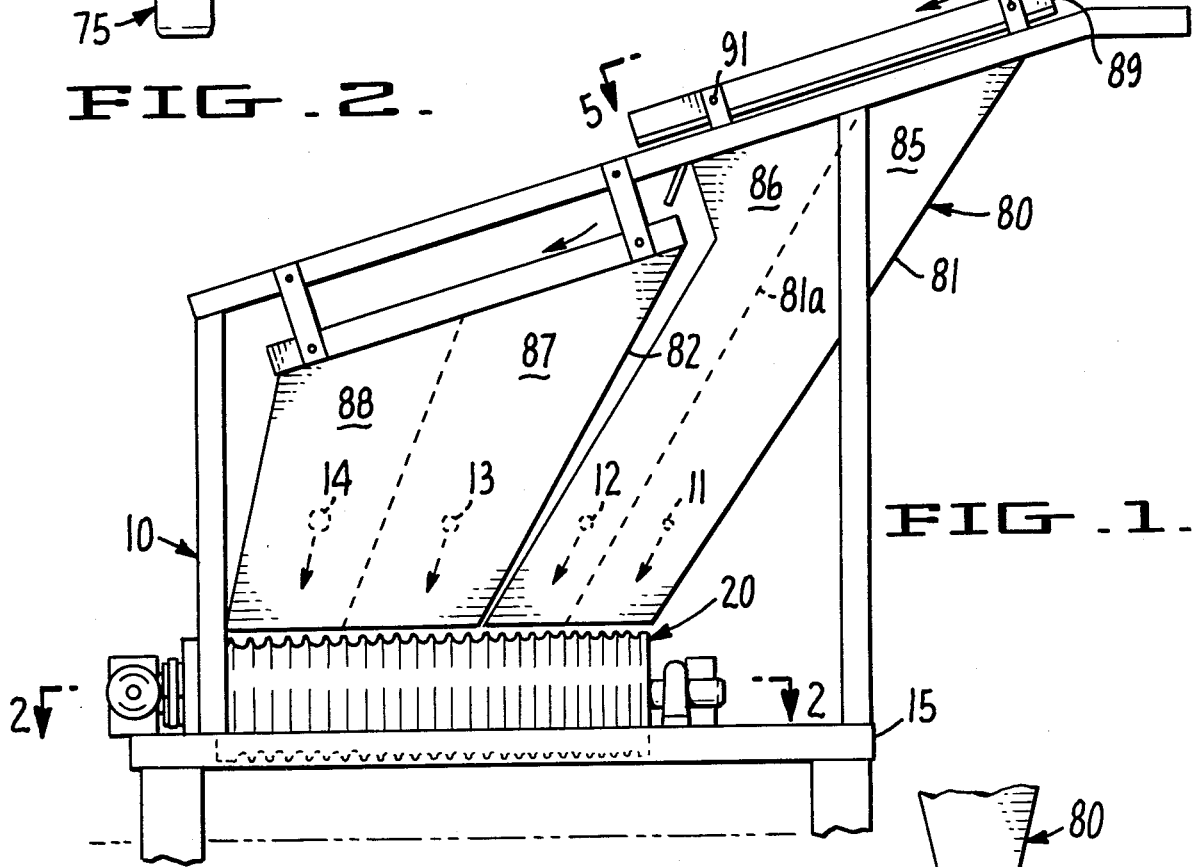
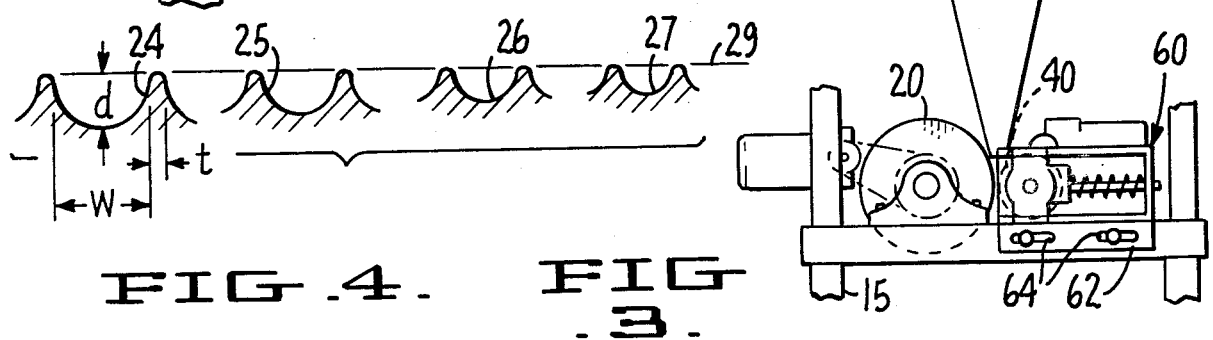

NUTCRACKING MACHINE

BACKGROUND OF THE INVENTION

This invention relates to an improved nutcracking machine in general and, more particularly, to a walnut cracking machine.

U.S. Pat. No. 2,144,841 discloses a nutcracking machine utilizing a pair of rollers having longitudinal ribs. The spacing between rollers is adjustable, but the distance between rollers is fixed, effectively allowing smaller sized nuts to pass between rollers without being cracked. A further disadvantage is that foreign material passing through the rollers may well jam or scar the surface of the rollers. A further disadvantage with longitudinal rollers is their tendency to crush with the rib, causing excessive and damaging impact on the nut meat.

U.S. Pat. No. 2,316,025 utilizes a complex arrangement of rollers having longitudinal ribs and the same operating limitations of U.S. Pat. No. 2,144,841.

U.S. Pat. No. 2,875,799 discloses a mechanism for breaking nut meats which utilizes a rotating tine for projecting into spaces between rotating discs. This mechanism would be quite ineffective in cracking shells of nuts largely because of the fixed spacing between the rotating discs, to say nothing of the presence of the third rotational body, the tines.

U.S. Pat. No. 1,183,574 relates to a cutting mechanism for cracking cereal grain. The mechanism utilizes sharp cutting edges to cut the grain and is not pertinent to cracking of nuts.

U.S. Pat. No. 2,879,952 relates to a rock crushing machine. The configuration does not apply to nutcracking, in that smaller rocks pass between the rolls without any crushing action.

SUMMARY OF THE INVENTION

The present invention provides an improved nutcracking machine in which a pair of rollers are adjustably and resiliently mounted so that predetermined amount of pressure is applied to the nuts passing therebetween. One of the rolls is a sizing roll which has a plurality of parallel and circumferential grooves, the width and depth of the grooves varying in a predetermined fashion along the length of the roll. The purpose of the grooves is to accommodate nuts of various sizes, so that small nuts passing through the rolls will be efficiently cracked simultaneously with the efficient cracking of much larger nuts. Therefore, a mixture of random sized nuts may be fed into the machine, and virtually all sizes will be efficiently cracked; but not crushed so as to damage the nut meat. The spring mounting of either roll has the additional advantage of allowing the rolls to separate momentarily to allow passage of foreign objects such as rocks to effectively prevent damage or even possible jamming of the rolls otherwise caused by the foreign objects.

A primary object of the invention is to provide an improved nutcracking machine which efficiently cracks various sized nuts passing through the machine simultaneously.

A further object of the invention is to provide a nutcracking machine in which the effective lateral pressure exerted on the nuts is adjustable to predetermined levels.

A further object of the invention is to provide an improved nutcracking machine through which foreign materials such as rocks may be passed without damaging or jamming the machine.

A further object of the invention is to provide an improved nutcracking machine which is efficient in operation and rugged in design.

Further objects and advantages of the invention will become apparent from the following description of a preferred embodiment and the drawings wherein:

FIG. 1 is a side elevational view of the apparatus;

FIG. 2 is a plan view of the sizing and cracking rolls taken along the line 2—2 of FIG. 1;

FIG. 3 is a front elevational view of the apparatus;

FIG. 4 is a schematic representation of the surface of the sizing roll;

DETAILED DESCRIPTION OF PREFERRED EMBODIMENT

Figure 5:
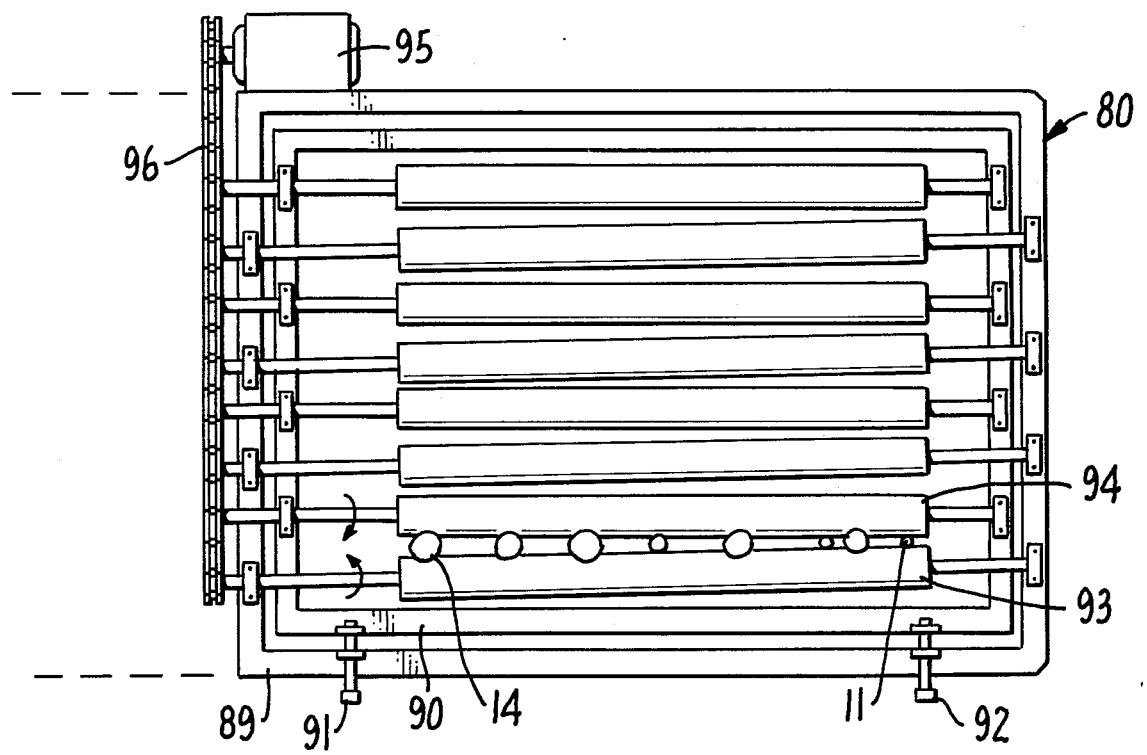
FIG. 5 is a plan view of the feeding apparatus along the line 5—5 of FIG. 1.

As shown best in FIGS. 1 and 2, the nutcracking machine shown generally as 10 has a feeding mechanism shown generally as 80 which feeds nuts such as walnuts 11, 12, 13 and 14 to a sizing roll 20 and cracking roll 40. The shells of walnuts 11–14 are cracked as they pass downwardly through the space between sizing roll 20 and cracking roll 40. The cracked nuts are then passed on as by conveyor to other machinery for further processing not related to this invention.

Frame 15 supports and carries sizing roll 20 and cracking roll 40.

Pillow block bearings 21 and 22 are carried by frame 15 and support sizing roll shaft 23.

The surface of sizing roll 23 has a plurality of parallel circumferential grooves, such as 24, 25, 26 and 27. These grooves are shown in greater detail in FIG. 4 in which the varying sizes of the grooves are shown schematically.

The depth d is 0.94 inches and the width w of groove 24 is 1.688 inches, the thickness t of the ridges at either side of groove 24 is 0.25 inches. The depth of groove 25 is 0.88 inches, the width 1,438 inches and the thickness of the ribs 0.25 inches. For groove 26, the depth is 0.75 inches, the width 1.25 inches, and the thickness 0.25 inches. For groove 27, the depth is 0.69 inches, the width 1.063 inches, and the thickness 0.25 inches. The upper extremity of each groove is located on the surface line 29 of sizing roll 20. Each of the grooves is arcuate and in the embodiment shown in FIG. 4, each groove subtends an angle of approximately 180° (the angle subtended may range from 160° to 180°). Brackets a, b, c and d of FIG. 2 represent grooves which are of similar design, that is, the seven grooves at the lefthand portion of sizing roll 20 of FIG. 2 are identically shaped. Similarly, as shown in FIG. 2, each of the grooves 25 is identically shaped. The shape of the grooves is variable and the mix of the sizes of the grooves is variable depending upon the nuts being cracked. The particular arrangement shown is the best arrangement for English Walnuts.

Cracking roll 40 is a cylindrical, metallic roll carried by frame 15 through spring mounting means 60. Cracking roll shaft 41 is mounted in bearings 42 and 42a and is driven by cracking roll drive means 70. The surface of cracking roll 40 is tractive as by roughening the surface with a welding rod as shown generally as 43. The position of cracking roll 40 relative to sizing roll 20 is adjustable by spring mounting means 60 and, as shown in phantom at 40a, the position of one side of cracking roll 40 may be moved closer to sizing roll 20 than the opposite end of cracking roll 40.

Spring mounting means 60 comprises spring 61 which urges bearing 42 in a direction toward sizing roll 20. Spring 61 is anchored by member 62 which is adjustably mounted to frame 15 by being mounted on slotted holes 64 in member 62 (shown best in FIG. 3). By selecting a spring 61 with proper characteristics and by adjusting the position of member 62, the lateral pressure exerted on the nuts passing between cracking roll 40 and sizing roll 20 may be adjusted through a wide variety of values in order to obtain maximum efficiency of cracking.

Cracking roll drive means 70 is a variable speed motor which drives cracking roll 40 through belt 71 at a predetermined speed. Sizing roll drive means 75 is a constant speed motor carried by frame 15 driving sizing roll 20 through belt 76.

Feeding means 80 comprises hopper 81 and hopper 82 which are each divided into two chambers 85, 86 and 87, 88 respectively, by webs 81a so that the smallest nuts such as 11 moving in the direction of arrow 84 are dropped into the first chamber 85 of hopper 81. Similarly, nut 12 being slightly larger than nut 11 passes into chamber 86 of hopper 81, nut 13 is fed into chamber 87 of hopper 82 and large nut 14 is fed to chamber 88 of hopper 82. Appropriate sized grooves of sizing roll 20 are disposed below the chambers 85–88 of feed means 80.

FIG. 3 shows the side elevational view of frame 15, feed means 80, sizing roll 20, cracking roll 40. FIG. 3 shows best the slots 64 of spring mounting means 60 for varying the position of spring mounting means 60 relative to frame 15.

FIG. 5 shows the upper portion of feed means 80. A first set of rollers is carried by frame 89 and a second set is carried by frame 90. Relative movement between frames 89 and 90 by adjusters 91 and 92 varies the angle of inclination between rollers 93 and 94 (as well as between te remaining pairs of rollers). The rollers are driven by motor 95 through chain drive 96. A small nut shown as 11, for example, passes between rollers 93 and 94, whereas large nut 14 is passed downwardly to larger hopper chamber 88.

Figure 6:
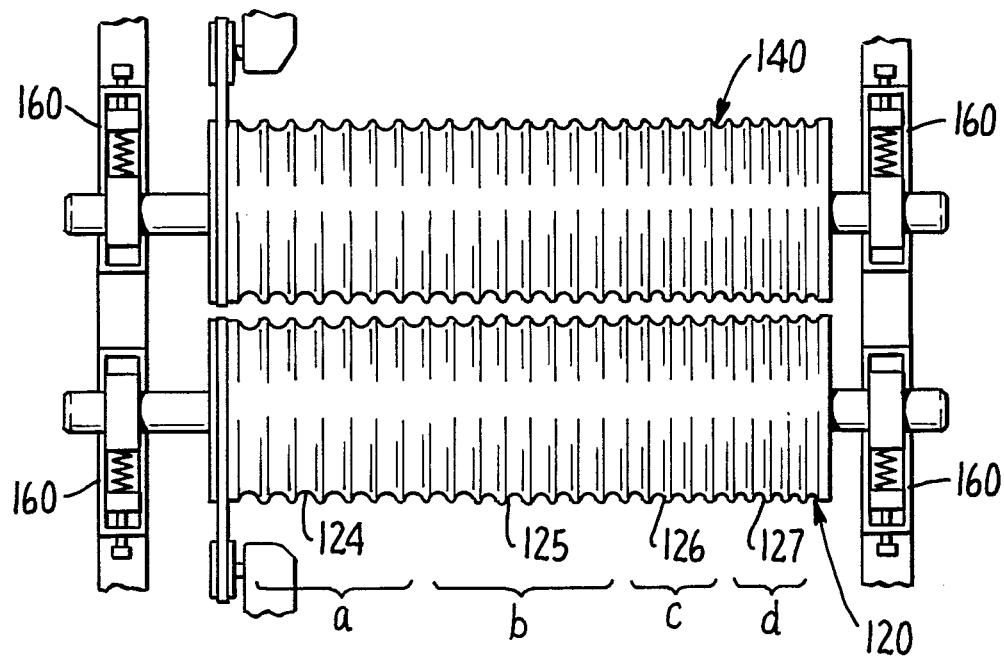
FIG. 6 is a plan view of an alternate embodiment of the invention.
Figure 7:
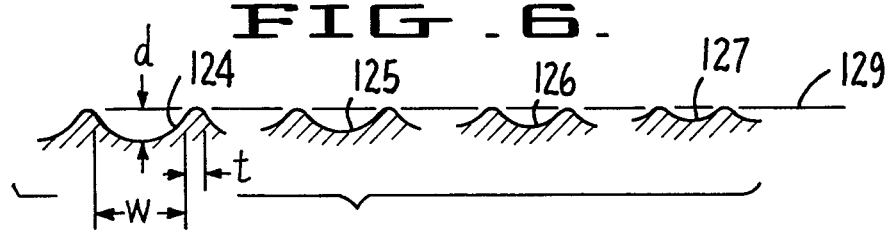
FIG. 7 is a schematic represenation of the surface of an alternate sizing roll.

FIGS. 6 and 7 illustrate an alternate embodiment in which cracking roll 140 is identical to sizing roll 120, each having a plurality of parallel circumferential grooves, the width and depth of said grooves varying in a predetermined fashion along the length of each roll. As shown in FIG. 7, the depth of the grooves are less in relation to the width than is the case with the embodiment shown in FIG. 2. The dimensions for FIG. 7 are as follows.

The width of groove 124 is 1.700 inches, depth is 0.450 inches and thickness 0.25 inches. Groove 125 has a width of 1.437 inches, a depth of 0.420 inches and thickness 0.25 inches. Groove 126 has a width of 1.250 inches, a depth of 0.355 inches and thickness 0.25 inches. Groove 127 has a width of 1.062 inches, a depth of 0.325 inches and thickness 0.25 inches.

The surfaces of grooves 124–127 are arcuate, and subtend an angle of approximately 140°. The angle subtended by each groove in the embodiment shown in FIGS. 6 and 7 may vary from 120° to 160°. The upper extremity of each of grooves 124–127 lies along surface line 129 of sizing roll 120.

In the alternate embodiment of FIG. 6, spring mounting means 160 are provided for both sizing and cracking rolls to provide maximum flexibility in varying the lateral pressure and the spacing between the cracking and sizing roll. The alternate embodiment shown in FIG. 6 will perform satisfactorily with spring mounting means 160 on either the sizing or cracking roll and rigidly mounting the other roll. However, the range of possible lateral pressures and spacing is diminished.

I claim:

1. An improved nut cracking machine comprising, in combination:

a frame, sizing roll means carried by said frame, said sizing roll means being cylindrical and having a plurality of parallel, circumferential arcuate grooves, the width and depth of said arcuate grooves varying in a predetermined fashion in multiple sets along the length of the roll, sizing roll drive means carried by said frame for driving said sizing roll at a selectable, predetermined speed, cylindrical cracking roll means carried by said frame, and mounted for rotation such that nuts are cracked by passing between said sizing roll means and said cracking roll means, but are not crushed, and whereby virtually all nuts regardless of size are subjected to approximately the same cracking force, spring mounting means for adjustably and resiliently urging said sizing roll and said cracking roll together, whereby foreign objects such as rocks will cause the sizing and cracking rolls to separate momentarily to allow passage therebetween of the foreign object without damaging either roll, and whereby the lateral pressure exerted by said rolls on nuts passing therebetween may be adjusted, and feeding means for separating larger nuts from smaller nuts and directing various sized nuts to appropriate sized arcuate grooves of said sizing roll whereby nuts of various sizes may be simultaneously cracked.

2. The apparatus of claim 1 in which said cracking roll means comprises a metallic cylinder having a tractive surface.

3. The apparatus of claim 2 in which each of said arcuate grooves subtends an angle of between 160° and 180°.

4. The apparatus of claim 1 in which said cracking roll is identical to said sizing roll.

5. The apparatus of claim 4 in which the arcuate grooves on said sizing and cracking rolls each subtends an angle of between 120° and 160°.

* * * * *